United States Patent
Peng et al.

(10) Patent No.: US 7,470,038 B2
(45) Date of Patent: Dec. 30, 2008

(54) DIFFUSER HAVING OPTICAL STRUCTURES

(75) Inventors: Ci-Guang Peng, Hsin-Chu (TW);
Chih-Lin Wang, Hsin-Chu (TW);
Jing-Huan Liao, Hsin-Chu (TW);
Shau-Yu Tsai, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 11/945,460

(22) Filed: Nov. 27, 2007

(65) Prior Publication Data
US 2008/0212321 A1    Sep. 4, 2008

(30) Foreign Application Priority Data
Mar. 3, 2007    (TW) ............... 96107366 A

(51) Int. Cl.
*F21V 33/00*    (2006.01)
(52) U.S. Cl. .............. 362/240; 362/223; 362/244; 362/246
(58) Field of Classification Search .......... 362/245, 362/244, 246, 236, 222, 223, 329, 240, 238
See application file for complete search history.

(56) References Cited

U.S. PATENT DOCUMENTS

| | | | |
|---|---|---|---|
| 6,805,465 B2 * | 10/2004 | Chen | ............ 362/246 |
| 2005/0276068 A1 | 12/2005 | Chen et al. | |
| 2006/0083019 A1 | 4/2006 | Hahm et al. | |
| 2006/0098288 A1 | 5/2006 | Pan et al. | |
| 2007/0030414 A1 | 2/2007 | Chang | |
| 2007/0058359 A1 * | 3/2007 | Saitoh et al. | ............... 362/97 |
| 2007/0147035 A1 * | 6/2007 | Hung et al. | ............. 362/240 |

FOREIGN PATENT DOCUMENTS

| | | |
|---|---|---|
| CN | 2791694 | 6/2006 |
| CN | 1908754 | 2/2007 |

OTHER PUBLICATIONS

Chinese language office action dated Apr. 4, 2008.
English language translation of abstract of CN 2791694.

* cited by examiner

*Primary Examiner*—Laura Tso
(74) *Attorney, Agent, or Firm*—Thomas, Kayden, Horstemeyer & Risley

(57) ABSTRACT

A diffuser used in a backlight module including a plurality of light sources is disclosed. The diffuser according to the present invention makes a uniform light output. The diffuser includes a transparent substrate and a plurality of optical structures. The transparent substrate has an entrance surface and an exit surface. The plurality of optical structures is disposed on the exit surface, each optical structure is dented from the exit surface to the interior of the transparent substrate and forms a refractive convex within the transparent substrate, and each refractive convex corresponds to one of the plurality of the light sources. The maximum value of the included angle between the tangent to the refractive convex edge and the normal to the exit surface is smaller than 30 degrees, such that an incident light ray from the light sources refracts and deviates from the normal to the refractive convex through the refractive convex.

16 Claims, 6 Drawing Sheets

DIFFUSER HAVING OPTICAL STRUCTURES

BACKGROUND OF THE INVENTION

1. Field of the Invention

The present invention relates generally to diffusers, and more particularly to a diffuser which outputs a uniform light used in a backlight module.

2. Description of the Prior Art

Since liquid crystal displays (LCD) are not self-luminous display devices, backlight sources are needed to provide light sources with sufficient brightness and uniform light output to show images properly. Current backlight sources mostly use light emitting diodes (LEDs) and cold cathode fluorescent lamps (CCFL) as the main luminous elements. LEDs have numerous advantages, such as wide color variety, low power consumption, small volume, low pollution produced, high reliability and great module flexibility, and thus have become increasingly important. However, when LCD panels use LEDs as the light sources, there will be frequent occurrence of uneven luminance of the light output. In order to distribute point light sources or linear light sources to a uniform surface source, diffusion films or diffusion plates are often used to generate a uniform light output.

The function of diffusion plates, diffusion sheets and diffusion films is to provide a uniform surface source for LCDs. Conventional diffusion films primarily use chemical grains added to the film substrate as scattering particles. The scattering particles of current diffusion plates are dispersed in the resin layer, therefore the light passing through the diffusion layer will be passing through continuously two medias with different refractive indexes, and there are concurrent light refraction, reflection and scattering for achieving optical scattering.

Recently, recent manufacturing method of diffusion films uses hologram-based technique. Through chemical processes, such as exposure and development, phase distributions of ground glasses are recorded to roughen the substrate surfaces of diffusion films and the ink spots and lines on the light guide plates are blurred by scattering. However, in the abovementioned light paths, light absorption is inevitable due to inherent and chemical particle properties of the materials, and light transmittance is thus reduced. In the abovementioned structure, part of the light is wasted for observers from a constant distance as light scattering is random, and thus may result in poor light utilization. In addition, the chemical processes of the manufacturing method of the diffusion films are more time-consuming, thus the associated cost is relatively higher. Consequently, the current manufacturing method of the diffusion films is still primarily the adding chemical grains method.

SUMMARY OF THE INVENTION

In light of the above drawbacks in prior art, it is an objective of the present invention to provide a diffuser that extends space distribution of light sources.

It is another objective of the present invention to provide a diffuser that redistribute light intensities through refraction.

It is a further objective of the present invention to provide a diffuser that generates a uniform light output.

The present invention discloses a diffuser used in a backlight module comprising a plurality of light sources, which generates a uniform light output effectively. The diffuser according to the present invention mainly includes a transparent substrate and a plurality of optical structures. The transparent substrate has an entrance surface and an exit surface, and the plurality of optical structures is disposed on the exit surface. Each optical structure is dented from the exit surface to the interior of the transparent substrate and forms a refractive convex within the transparent substrate, and each refractive convex corresponds to one of the plurality of light sources. The included angle between the tangent to the refractive convex edge and the normal to the exit surface lead an incident light ray from the light sources to refract and deviate from the normal to the refractive convex through the refractive convex.

The maximum value of the included angle between the tangent to the refractive convex edge and the normal to the exit surface is smaller than 30 degrees. The width of the optical structure is substantially smaller than 15.6 mm plus the width of the light source. The materials of the transparent substrate include polymethyl methacrylate (PMMA), polycarbonate (PC), polystyrene (PS), MS Plastic or the combination of the abovementioned materials. The refractive convex includes a cone shape, a hemisphere shape and other suitable shapes. The optical structures include a plurality of grooves extending along the exit surface, and the grooves have conical cross-sections, hemispherical cross-sections or other suitable cross-sections.

The present invention also provides a backlight module including a plurality of light sources and a first diffuser. The first diffuser includes a transparent substrate and a plurality of optical structures. The transparent substrate has an entrance surface and an exit surface, and the plurality of optical structures is disposed on the exit surface. Each optical structure is dented from the exit surface to the interior of the transparent substrate and forms a refractive convex within the transparent substrate, and each refractive convex corresponds to at least one of the plurality of the light sources. The included angle between the tangent to the refractive convex edge and the normal to the exit surface refracts an incident light ray from the light sources and the incident light ray deviate from the normal to the refractive convex through the refractive convex. The maximum value of the included angle between the tangent to the refractive convex edge and the normal to the exit surface is smaller than 30 degrees.

The backlight module in accordance with the present invention further includes a second diffuser disposed corresponding to the exit surface of the transparent substrate of the first diffuser. The distance between the light sources and the entrance surface of the transparent substrate is substantially smaller than 4.5 mm, and the width of the optical structure is substantially smaller than 15.6 mm plus the width of the light. The materials of the transparent substrate include PMMA, PC or the combination of the above materials. The refractive convex includes a cone shape, a hemisphere shape and other suitable shapes. The optical structures include a plurality of grooves extending along the exit surface, and the grooves have conical cross-sections, hemispherical cross-sections or other suitable cross sections.

The aforementioned objects, features and advantages of the present invention will become apparent from the following detailed description of the various embodiments taken together with the accompanying drawings.

BRIEF DESCRIPTION OF THE DRAWINGS

FIG. 1c is a side view of the diffuser illustrated in FIG. 1a.

DETAILED DESCRIPTION OF THE PREFERRED EMBODIMENT

Numerous specific details are set forth in the following description in order to provide a thorough explanation of various embodiments of the present invention, and the accompanying drawings are provided for illustration purposes only and are not intended to limit the present invention.

The present invention provides a diffuser for a backlight module to redistribute light intensity by using the highest-intensity angular energy through the diffuser of the present invention in order to produce light refraction and to re-add up a greater-angle weaker energy not passing through the diffuser to obtain a new angular energy distribution. Therefore, space distribution of the point spread function (PSF) of the original light sources can be extended, and a desired uniform light output is achieved after the backlight generated by the point light sources or linear light source passes through the diffuser in accordance with the present invention.

Figure 1A:
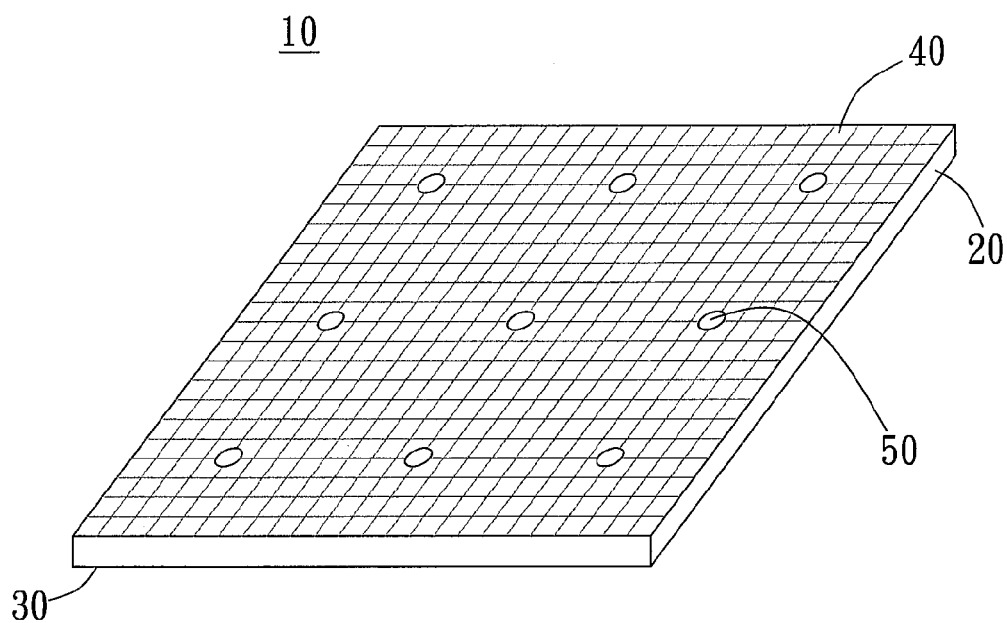
FIG. 1a is a 3D view of the diffuser according to one embodiment of the present invention.
Figure 1B:
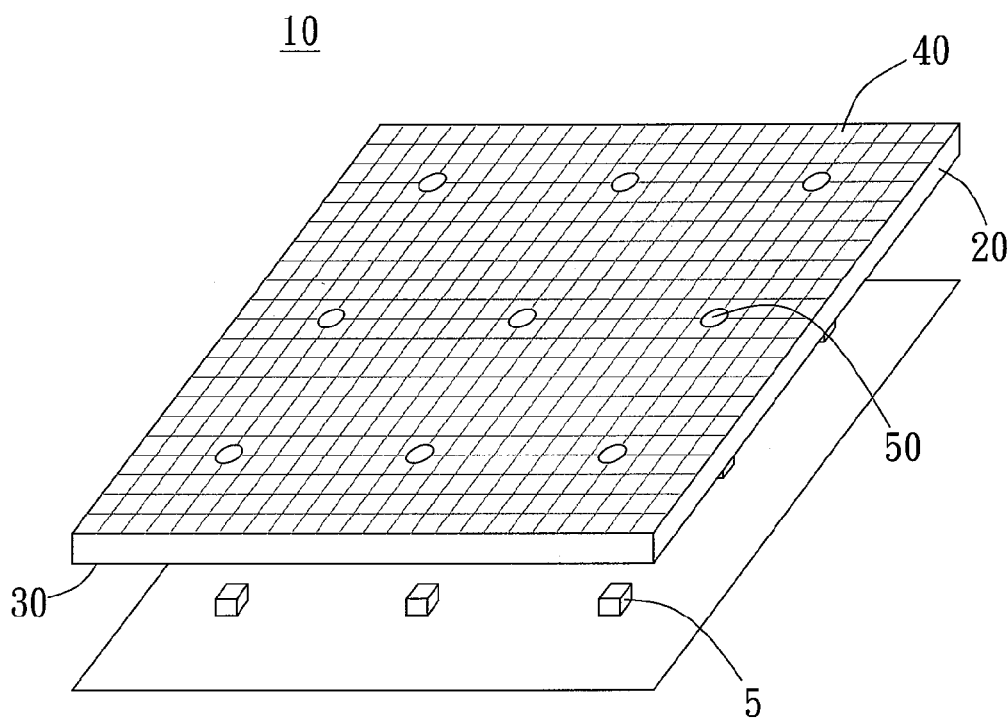
FIG. 1b is a 3D view of the backlight module according to one embodiment of the present invention.

As shown in FIG. 1a, the diffuser 10 according to the present invention comprises a transparent substrate 20 and a plurality of optical structures 50. In the preferred embodiment, the thickness of the transparent substrate 20 ranges between 1.5 millimeter (mm) and 2 mm; however, in other embodiments, the thickness of the transparent substrate 20 may vary depending on actual requirements. The materials of the transparent substrate 20 include polymethyl methacrylate (PMMA), polycarbonate (PC), the combination of the abovementioned materials or other suitable materials. The transparent substrate 20 has an entrance surface 30 and an exit surface 40. As FIG. 1b shows, when placed in a backlight module, the entrance surface 30 corresponds to a plurality of light sources 5.

Figure 1C:
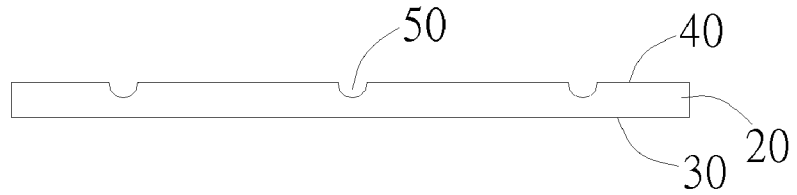
Figure 1D:
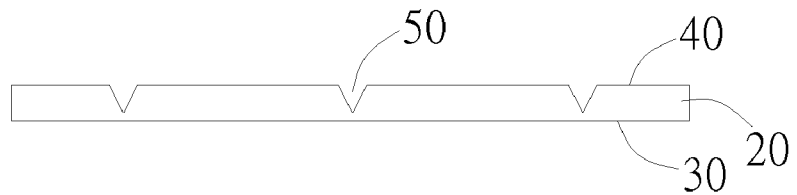
FIG. 1d is a side view of the diffuser according to another embodiment of the present invention.

As shown in FIG. 1c, the optical structures 50 are disposed on the exit surface 40, and each optical structure 50 is formed by denting the exit surface 40 to the interior of the transparent substrate 20. The optical structures 50 respectively form refractive convexes within the transparent substrate 20, and each refractive convex corresponds to one of the light sources. The abovementioned refractive convex indicates a curved surface protruding toward the inside of the transparent substrate and forms a critical plane where the optical structures 50 facing the inside of the transparent substrate. In this embodiment, the refractive convex has a hemisphere illustrated in FIG. 1d, but it may be a cone or other suitable curves. The optical structures 50 are preferably formed on the transparent substrate 20 by manufacturing processes including printing, etching, hot rolling or other suitable methods.

Figure 2A:
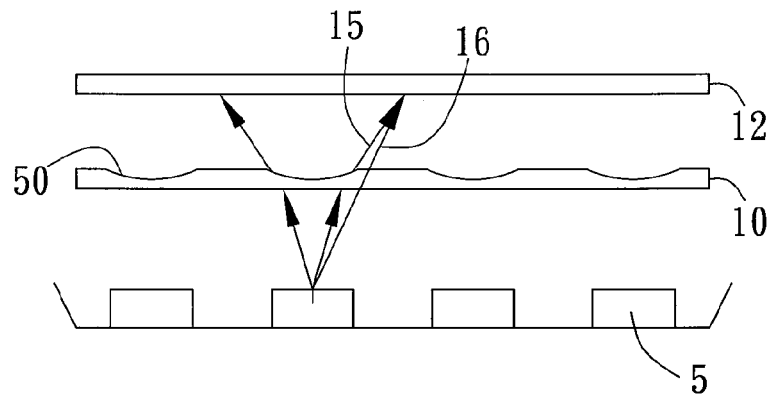
FIG. 2a is a perspective view of an embodiment of the present invention.

FIG. 2a is a perspective view of one embodiment of the present invention. In this backlight module, after lights generated by the light sources 5 pass through the optical structures 50 of the diffuser 10, a desired effect of uniform light output is obtained, and this substantively reduces the occurrence of uneven light intensities when only a conventional diffuser 12 is used. A light ray 15 is the incident light passing through the optical structure on the diffuser 10, and the light ray 15 is refracted and deviates from the normal to the refractive convex after the light ray 15 passing through the refractive convex. A light ray 16 does not pass through the optical structure, therefore it reaches the conventional diffuser 12 linearly. As shown clearly in FIG. 2a, the light ray 15 and the light ray 16 will be combined after they both reach the conventional diffuser 12, such that the weaker light with greater-angle is combined to produce a new energy distribution having different angle and generate a uniform light output. However, in other embodiments, one may use only the diffuser 10 with having other diffusers 12.

Figure 2B:
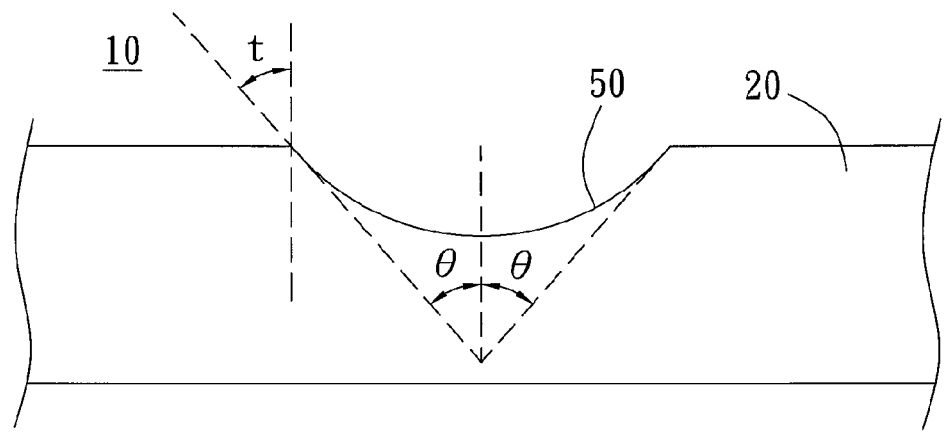
FIG. 2b is a perspective view showing the vertex angle of the refractive convex.
Figure 2C:
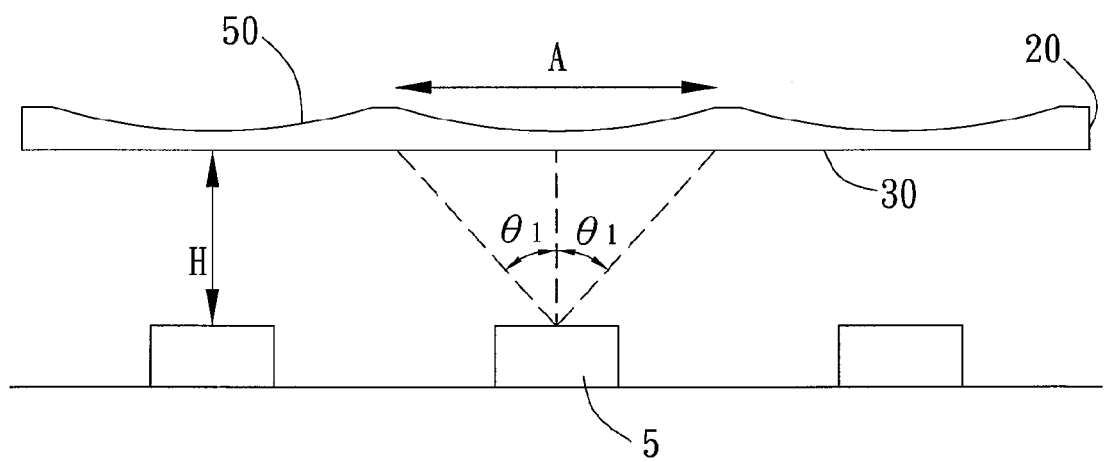
FIG. 2c is a perspective showing the light angle of the light sources.

For the hemispherical refractive convex, assume that the vertex angle of the refractive convex equals to $2\theta$, as shown in FIG. 2b, and light angle, $\theta_1$, which passes through the refractive convex lies between plus and minus 60 degrees, i.e. $-60°<\theta_1<60°$ as shown in FIG. 2c. In order to avoid total internal reflection (TIR), the equation deduced is $3\theta<90°-\theta_1$, and by equating the angle $\theta_1$ to 0 degree in the equation $3\theta<90°-\theta_1$, we will get the maximum value t of the included angle between the tangent to the refractive convex edge and the normal to the exit surface which is smaller than 30 degrees. In the preferred embodiment, the distance H between the light sources and the entrance surface 30 of the transparent substrate 20 is smaller than 4.5 mm; the width A of the optical structure equals $2*H*\tan(\theta_1)=2*4.5$ mm*tan$(60°)=15.58$ mm; in other words, the width of the optical structure is substantially smaller than 15.6 mm plus the width of the light source.

Figure 3A:
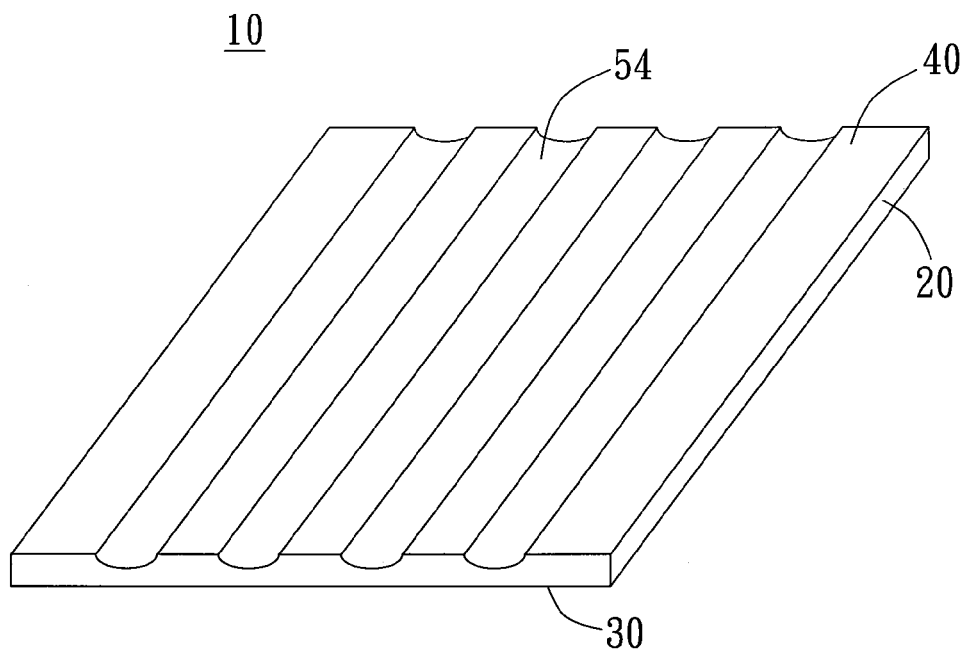
FIG. 3a is a 3D view of the diffuser according to another embodiment of the present invention.
Figure 3B:
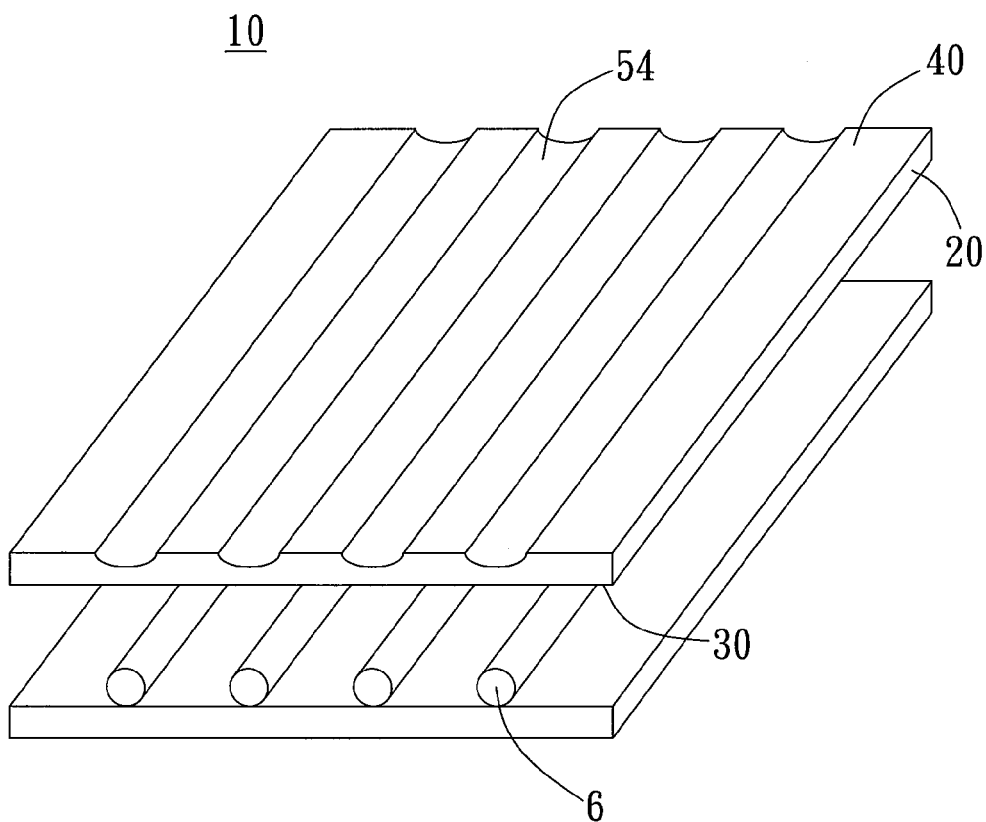
FIG. 3b is a perspective view of one embodiment of the present invention in which lamp tubes are used as the light source.
Figure 3C:
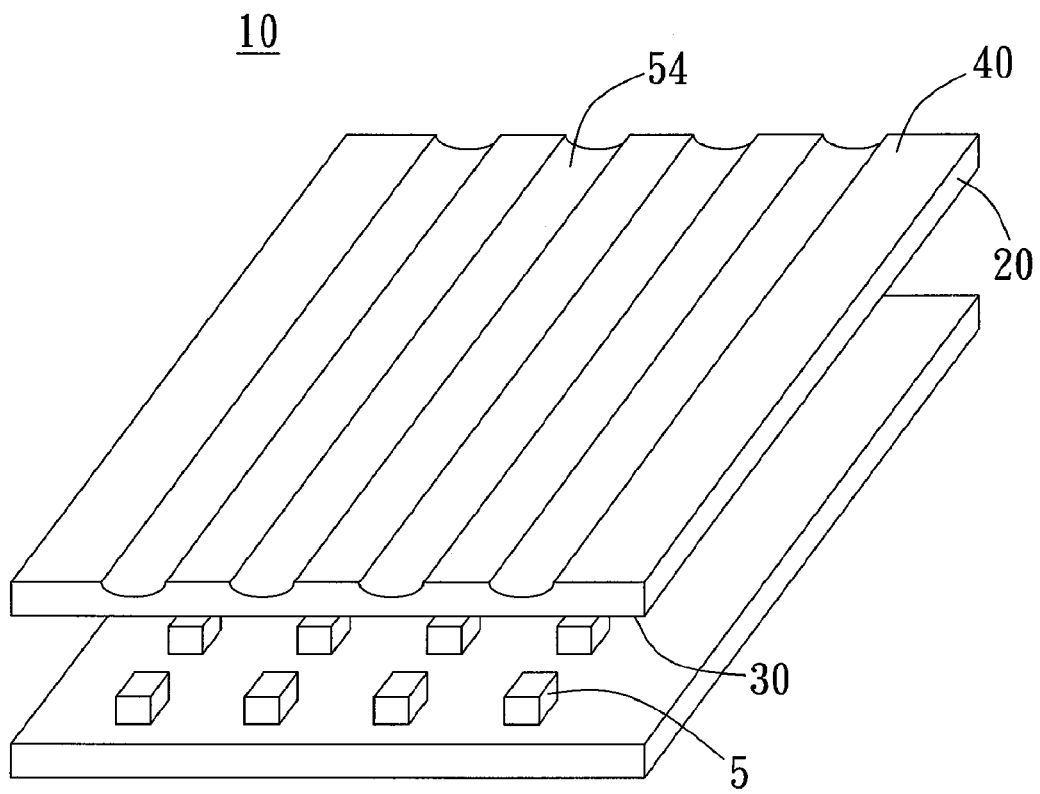
FIG. 3c is a perspective view of another embodiment of the present invention in which point light sources are used as the light source.

In the embodiment shown in FIG. 3a, the optical structures include a plurality of grooves extending along the exit surface 40. In this embodiment illustrated in FIG. 3a, the diffuser 10 includes the transparent substrate 20 and a plurality of optical structures 54 having grooves, and the grooves have hemispherical cross-sections. The transparent substrate 20 has the entrance surface 30 and the exit surface 40. When the diffuser 10 is placed in a backlight module, the entrance surface 30 corresponds to the plurality of light sources. The plurality of optical structures 54 are formed on the exit surface 40. Each optical structure 54 is dented from the exit surface 40 to the interior of the transparent substrate 20 and forms a refractive convex on the transparent substrate 20, and each refractive convex corresponds to one of the plurality of light sources. The light sources may be linear light sources, such as lamp tubes 6 shown in FIG. 3b, or may be point light sources, such as LED point light sources 5 shown in FIG. 3c.

Figure 4:
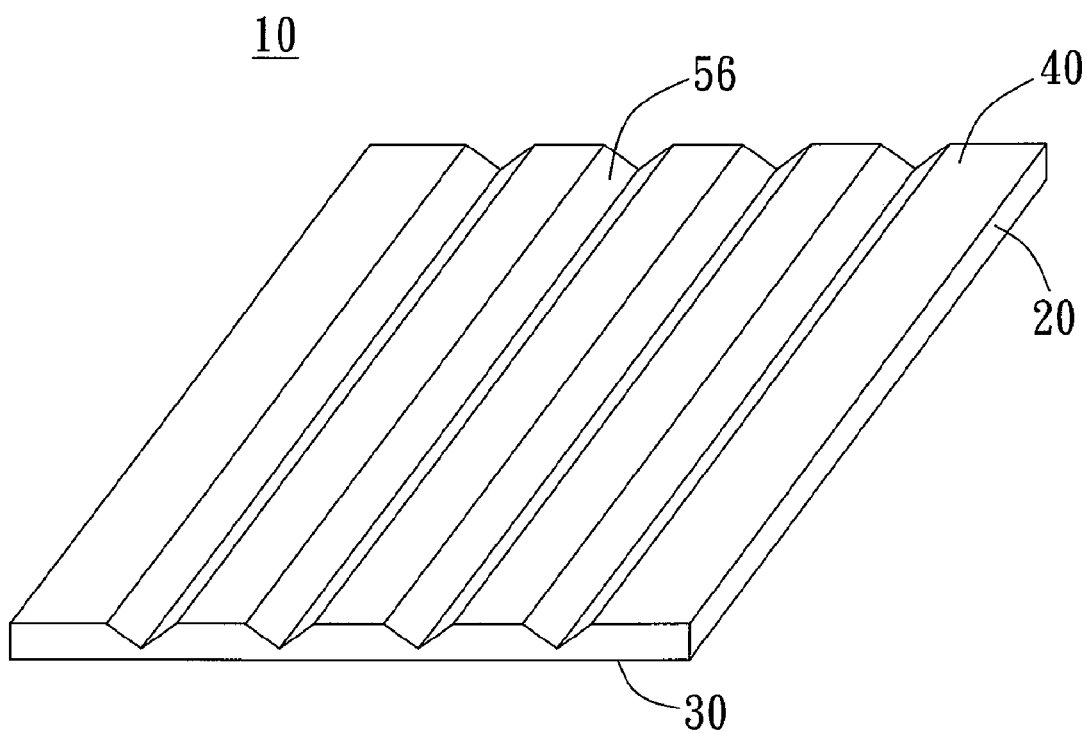
FIG. 4 is a 3D view of the diffuser according to yet another embodiment of present invention.

The grooves may also be conical grooves 56 shown in FIG. 4. Besides different cross-sectional shapes of the grooves, other aspects of this embodiment are similar to that of the embodiment shown in FIG. 3a. When the diffuser 10 is placed in a backlight module, the entrance surface 30 of the transparent substrate 20 corresponds to the light sources, and the plurality of the optical structures 56 are disposed on the exit surface 40. Besides the grooves having the above hemispherical and conical cross sections, the grooves may also include optical structures having other suitable cross sections.

From the foregoing, it shall be appreciated that specific embodiments of the invention have been described herein for purposes of illustration, but that various modifications and alterations may be made by those skilled in the art without deviating from the spirit and scope of the invention. For example, it shall be understood that there is no intention to limit the optical structure 50 to the specific forms disclosed, but on the contrary, the invention is to cover all modifications, alternate constructions and equivalents falling within the spirit and scope of the invention. Accordingly, the invention is not limited except as by the appended claims.

What is claimed is:

1. A diffuser for a backlight module having a plurality of light sources, the diffuser comprising:
   a transparent substrate having an entrance surface and an exit surface; and
   a plurality of optical structures disposed on the exit surface, each optical structure is dented from the exit surface to an interior of the transparent substrate and forms a refractive convex within the transparent substrate, wherein each refractive convex corresponds to one of the plurality of light sources;
   wherein an included angle between a tangent to the refractive convex edge and a normal to the exit surface leads an incident light ray from the light sources to refract and deviate from a normal to the refractive convex through the refractive convex.

2. The diffuser of claim 1, wherein a maximum value of the included angle between the tangent to the refractive convex edge and the normal to the exit surface is smaller than 30 degrees.

3. The diffuser of claim 1, wherein the optical structure width is approximately smaller than 15.6 millimeter (mm) plus a width of light source.

4. The diffuser of claim 1, wherein the materials of the transparent substrate include polymethyl methacrylate (PMMA) or polycarbonate (PC).

5. The diffuser of claim 1, wherein the refractive convex includes a cone shape or a hemisphere shape.

6. The diffuser of claim 1, wherein the optical structures include a plurality of grooves extending along the exit surface.

7. The diffuser of claim 6, wherein the grooves have conical or hemispherical cross-sections.

8. A backlight module comprising:
   a plurality of light sources; and
   a first diffuser comprising:
      a transparent substrate having an entrance surface and an exit surface; and
      a plurality of optical structures disposed on the exit surface, each optical structure is dented from the exit surface to an interior of the transparent substrate and forms a refractive convex within the transparent substrate, wherein each refractive convex corresponds to at least one of the plurality of light sources;
      wherein an included angle between a tangent to the refractive convex edge and a normal to the exit surface leads an incident light ray from the light sources to refract and deviate from a normal to the refractive convex through the refractive convex.

9. The backlight module of claim 8, wherein a maximum value of the included angle between the tangent to the refractive convex edge and the normal to the exit surface is smaller than 30 degrees.

10. The backlight module of claim 8 further comprising a second diffuser corresponding to the exit surface of the transparent substrate of the first diffuser.

11. The backlight module of claim 8, wherein a distance between the light sources and the entrance surface of the transparent substrate is substantially smaller than 4.5 mm.

12. The backlight module of claim 11, wherein a width of the optical structure is substantially smaller than 15.6 mm plus the light source width.

13. The backlight module of claim 8, wherein the materials of the transparent substrate include PMMA or PC.

14. The backlight module of claim 8, wherein the refractive convex includes a cone shape or a hemisphere shape.

15. The backlight module of claim 8, wherein the optical structures include a plurality of grooves extending along the exit surface.

16. The backlight module of claim 15, wherein the grooves have conical or hemispherical cross-sections.

* * * * *